United States Patent [19]

Weber

[11] 4,259,667
[45] Mar. 31, 1981

[54] INFORMATION INTERCHANGE BETWEEN AN INTELLIGENT OPERATOR, INDICIA BEARING DOCUMENTS, AND RESPONSIVE APPARATUS

[76] Inventor: Harold J. Weber, 20 Whitney Dr., Sherborn, Mass.

[21] Appl. No.: 40,496

[22] Filed: May 21, 1979

[51] Int. Cl.³ .............................................. G09B 7/00
[52] U.S. Cl. ............................... 340/707; 340/365 P; 434/337; 434/358
[58] Field of Search .................... 340/706, 707, 365 P, 340/708; 35/6, 9 C; 179/18

[56] References Cited

U.S. PATENT DOCUMENTS

| 3,720,006 | 3/1973 | Boram et al. | 35/9 C |
| 3,768,073 | 10/1973 | Rawson et al. | 340/707 X |
| 3,932,862 | 1/1976 | Graven | 340/365 P |
| 4,060,915 | 12/1977 | Conway | 35/9 C |
| 4,111,421 | 9/1978 | Mierzwinski | 340/706 X |
| 4,142,183 | 2/1979 | Castleberry et al. | 340/706 |

Primary Examiner—David L. Trafton

[57] ABSTRACT

Described is a method for utilizing a unique hand-held probe or the like, in conjunction with a responsive apparatus, as the means to establish cooperative response evaluation between an intelligent being and an evaluatory system. The method involves the emplacement of a translucent document, such as ordinary bond paper, over a field of individual light sources laid out in some predefined pattern which effects correspondence between the sources and indicia which is usually included on the document obverse surface. The copulative probe is positioned, usually by the being's hand, so as to receive some part of the light rays which permeate the paper and to convert the energy into a pattern of electrical signals which tell-tale which particular light element in the field of sources has been selected. The light rays which diffuse through the document also act to provide visible energy which can be perceived by the being to help guide the probe placement for strongest signal response.

14 Claims, 9 Drawing Figures

INFORMATION INTERCHANGE BETWEEN AN INTELLIGENT OPERATOR, INDICIA BEARING DOCUMENTS, AND RESPONSIVE APPARATUS

SUMMARY

The interchange of intelligent information between an operator, an indicia bearing document, and a machine is provided as a method by which the value of an interrogative response may be measured. The document is positioned over a pulsating light source, which usually provides at least several distinctive zones of visible light each encoded with a different pulse pattern. The light diffuses through, or transilluminates, the document. In the usual implementation the document is a sheet of paper or the like overprinted with some meaningful instruction, which is caused to distinctly glow in predefined areas on the obverse side by some part of the diffuse light which permeates the document. The operator selectively positions a copulative receptor, which usually is in the form of a handheld pen-like probe, over selected back-lit indicia whereupon the diffuse light acts upon a photocell producing a signal which couples to the translative elements which form an effective part of the responsive apparatus. The result is a tell-tale indication signalling the operator as to the propriety of his selected response entry. Further implementation permits the response indication to be adapted as a binary language suitable for computer guidance. The teaching further elaborates on novel ways for effecting better visual brightness from the pulsating light sources, for reducing response to extraneous light, for improving electrical immunity of the translative elements to marginal input signal values which might cause multiple or false tell-tale response, and for machine advancement of the problem selection number.

Therefore improvement is to be found in the use of uniquely gated, pulse coded light sources arranged in a matrix like array, or other suitable fixation, to provide a field of usually at least several separate regions of light which serve to project onto the back of a translucent document which is positioned as an overlay.

Still further novelty is found in the permeation of the projected pulse coded light through the translucent nature of the document substrate so as to effect, albeit diffuse, zones of light on the obverse surface.

Yet another improvement resides in the operator's ability to alterably select any one of several diffuse zones of illumination appearing on the obverse document surface which may coincide with an intelligible act performed by the operator.

Still better improvement is found in that the intelligible act response is usually implemented by way of a handheld, pen-like probe which has an input port on one end thereof which can be convienently positioned over some zone of diffuse light on the document obverse surface.

Yet further novelty resides in the corresponding evaluation between the back illuminated overlaid document indicia and the operator selection by way of the distinctive value of each light source pulse code pattern which is uniquely responsive as an intensity fluctuation produced by the encoding signal but which is further perceived as a visible light value having substantially constant brightness by an operator due to the effects of the eye's persistance of vision, resulting in the effectual obviation of operator decision based on even subliminal response due to the light energy flashing produced by the encoding signal.

DESCRIPTION OF DRAWINGS

Five sheets of drawings including nine figures depict the gist of the invention, as.

DESCRIPTION OF INVENTION

Figure 1:
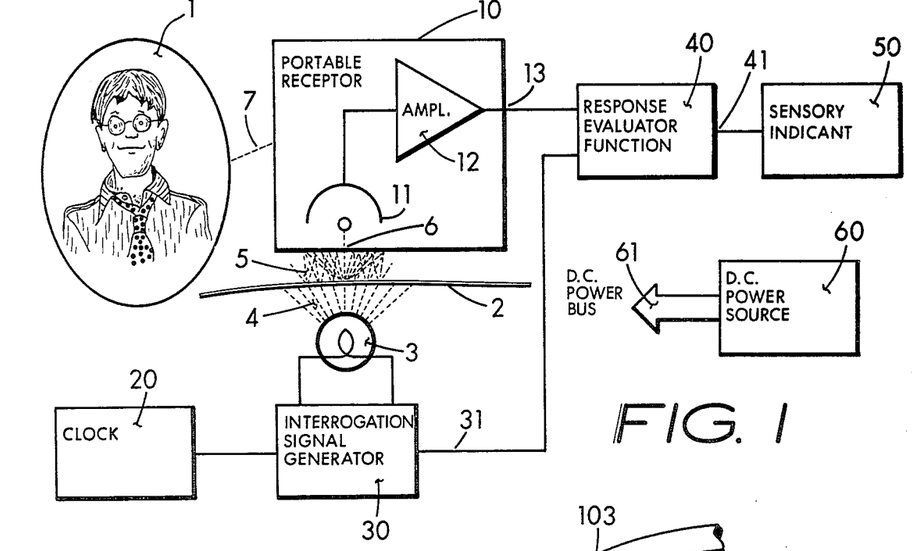
FIG. 1 shows an overall functional diagram including the elements essential to the teaching.

The essence of the instant invention is depicted in FIG. 1. In the broadly preferred embodiment, an operator manipulates the copulative receptor 10 relative to a substantially stationary signal source 3 which is overlaid with a substrate effecting an interrogative document 2. In the usual form for the receptor this portable relationship is accomplished by holding the receptor, which in one particular embodiment is in the form of a pen shaped probe, in the hand as with a pencil or the like. This interaction 7 between the operator 1 and the receptor 10 serves to effectively position the receptor in a useful way over the interrogative document 2 substrate. The document substrate is irradiated from the reverse side by primary electromagnetic, viz light, rays 4 produced by a source 3 which is arranged in subjacent proximateness relative to the obverse surface of the substrate. The document substrate 2 is accordingly selected so as to be at least partially transparent, e.g. translucent, to some of the energy rays 4, thereby providing the secondary rays 5 to be available as an electromagnetic coupling mechanisim between the surface of the document 2 and an input port 6 on the receptor 10. In practice, the primary rays 4 are usually a combination of visible and infrared light energy concentrated for the most part between about 4,000 Angstroms and 8,000 Angstroms as produced by a light source 3 which may be a light emanating diode. The primary rays 4 serve to transilluminate the interrogatory document 2, which is usually a translucent paper such as might be exampled by 20 pound bond paper, or the like, which serves as a convienent document 2 substrate. Such material allows a goodly transmission, albeit diffused, of the primary rays 4 resulting in secondary rays 5 having good intensity. The effect is twofold: (a) the visible wavelength diffused secondary rays 5 appear to the eye of an operator as a visible spot of light on the surface of the document 2 which overlays the source 3, thereby providing visible denotation, e.g. indicating to the operator the whereabouts of the correct zone or area in which to direct the manipulative input port 6 of the copulative receptor so as to maximize the transcoupled response; and, (b) the secondary rays, visible and invisible, serve as an electromagnetic coupling medium between the source 3 and the receptor input detector 11. In the usual form, the detector is a photocell such as a phototransistor, photodiode, or the like. The detector response signal produced by the electromagnetic coupling rays 4, 5 is amplified 12 so as to produce an output signal 13.

The primary rays 4 produced by the signal source 3 are not continuous, but rather consist of sequential code patterns of brief light bursts occurring in rapid-fire order faithfully representative of the excitation signal produced by the interrogation signal generator 30, the effect being that the operator sees the transilluminative spot of light as an apparently steady light due to the persistance of vision, whereas the receptor detector 11 recovers the code pattern intrinsic in the transcoupled patterned secondary light ray bursts and resultingly produces a pulse train signal at the output 13.

The control of the source 3 is afforded by a clock 20 which produces a moderately high frequency chain of pulses which couple to the interrogation signal generator.

While up until now, the source 3 has been treated in the singular sense, the artisian should understand that the source 3 will usually consist of some plurality of individually excited emanators, each coupled in a separate way to the generator 30. What results is that some plural number of spots of light appear in different positions on the obverse surface of the document 2. These individual spots of light in turn are utilized as coupling indicators for interrogatory indicia overlaid on the substrate surface. In the usual form, this is to say the individual spots of light delineate the whereabouts of the response options, e.g. answers or the like, to one or more interrogative statements imprinted on the substrate obverse surface.

Since each of the plural sources 3 couple independently to the generator 30, one of the principal purposes for the generator is to drive each source with a unique sequential pulse train code pattern which results in each of any number of sources having a distinct signature of rapid-fire sequential light burst code patterns.

The purpose for the portable copulative receptor 10 ought now to be more apparent to the practitioner, for the interactive positioning 7 by the operator 1 allows the input port 6 to be selectively positioned over only one of several secondary ray 5 patterns arranged as a field of distinctly separate light spot patterns relative to the document 2 imprinted indicia. This selective process results in a distinctive pulse train code pattern at the receptor 13 output which serves as an indicative signal response for the particular operator selection.

The generator 30 also produces a synchronization signal 31 which, together with the receptor input signal 13, is coupled to the input of the response evaluator function 40. The evaluator is a combinative, decision making, network which produces an indicative output signal 41 the value of which is weighted by the measure assigned to the selected one of any of the several sources 3 being steerably coupled to the receptor 10. The indicative output signal 41 couples to a sensory indicant function 50, as might be exampled by a visual display such as a "right" or "wrong" lamp or a displayed number giving value or merit to the selected response. The indicant may instead produce an audio signal the pitch or volume of which is indicative of the selected response exactitude value. The sensory indicant function 50 may also suitably be satisfied through interface with a digital data bus for computer interface.

A power supply 60 serves as a source of d.c. power 61 for operation of the related circuit functions comprising the overall apparatus.

Figures 2, 3:
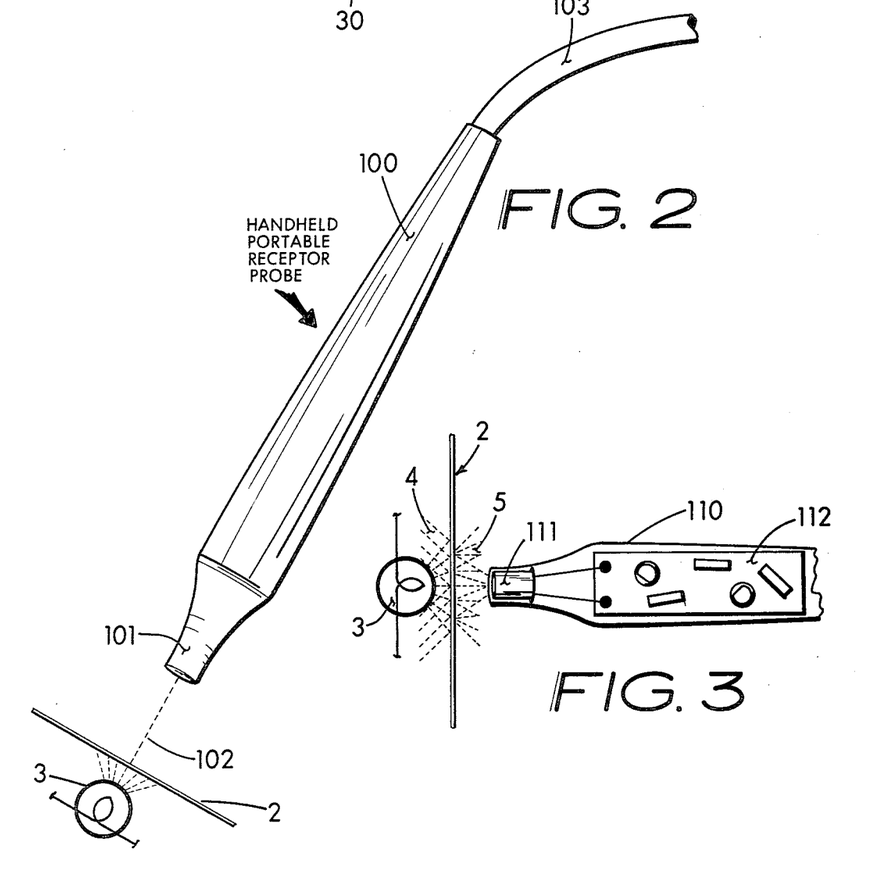
FIG. 2 view of a pen-like probe, in approximate actual size, which may be moved about by an operator's hand.
FIG. 3 closeup detail showing intercourse between signal source, document, and copulative receptor elements.

A particular portable copulative receptor embodiment is shown in FIG. 2. The elements comprising the receptor are contained within a probe assembly 100 which is about the size and form of a writing pen, making for convienent handheld manipulation. The business end of the probe 101 contains the light detector, e.g. photocell, which acts to receive any near on-axis secondary light rays entering by path 102. The resulting electrical signal couples through interconnective cable 103.

A skeletal view of the business end of the probe 100 is depicted in FIG. 3. In particular the photocell 111 is shown in proximal relationship with the source 3 and the interrogative document 2 so as to receive rays 5. The probe 100 housing 110 also serves as a containment for certain circuit elements 112 essential to the probe's operation.

Figure 4:
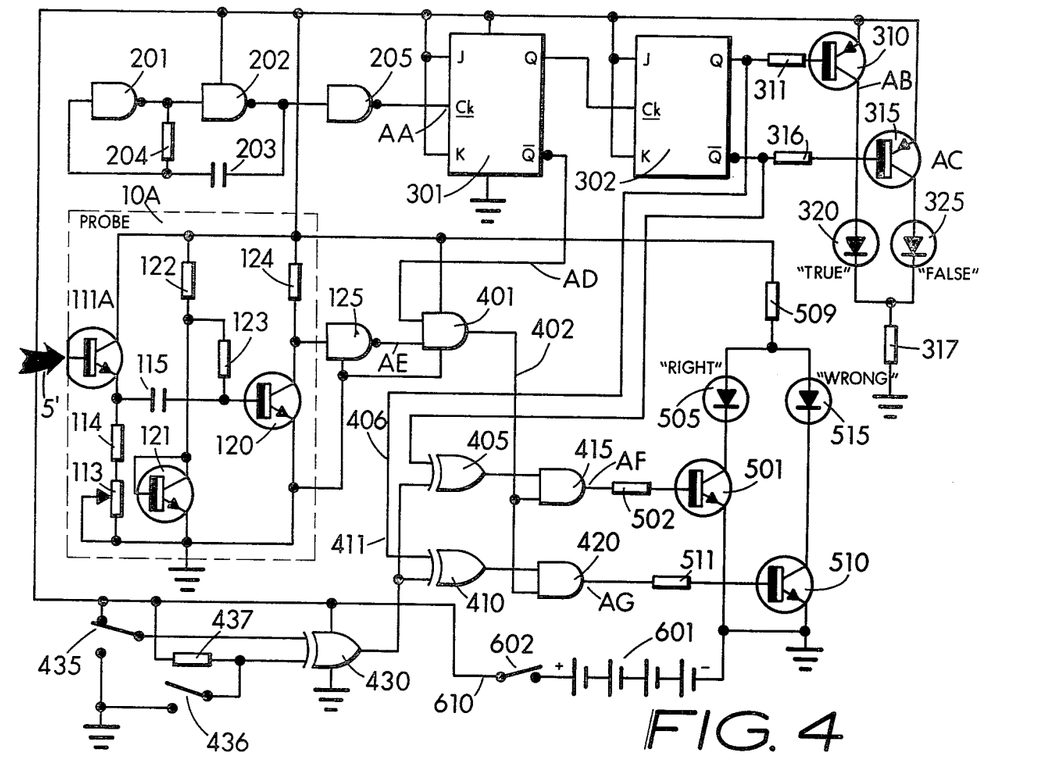
FIG. 4 electrical diagram for one embodiment embracing the instant teaching.

A TRUE or FALSE, e.g. choice one or choice two, circuit including the handheld responsor and generator circuits appears in FIG. 4. The probe 10A is shown to include a phototransistor 111A which is a.c. coupled through a capacitor 115 to the base of an amplifier transistor 120. The photodetector emitter resistor 114 together with potentiometer 113 serves to establish the baseline light level response sensitivity for the probe, e.g. increasing the effective resistance in the emitter circuit increases the effective light sensitivity. The transistor 120 base is, in a no-signal condition, held very near turn-on by the slight forward bias developed across diode connected transistor 121 together with resistors 122, 123. The effect of this connection is that very little signal need be developed in the photodetector 111A emitter, as coupled through capacitor 115, in order to turn-on the device 120, causing the positive value on the collector to collapse to a low value as developed across resistor 124 and coupled to signal conditioning inverter 125. The purpose for capacitive coupling by way of element 115 is to thwart response to steady state or low frequency a.c., i.e. 60 hertz or the like, stray fields such as might be present when the device is utilized in the typical classroom or office environment where flourescent lighting is commonly used. For that purpose, the capacitor 115 value is small, being only a few hundred picofarads, so as to respond in a satisfactory way to the leading edge rise-time, viz effective frequency component, of the gated light source. The usual time constant for the combination of the capacitor 115 and resistor 123 is expressed to be about:

$$R_{123}C_{115} < 1/4F_c < R_{123}C_{115}/10$$

for good rejection of lower frequency components, where $F_c$=CLOCK frequency.

Figure 5:
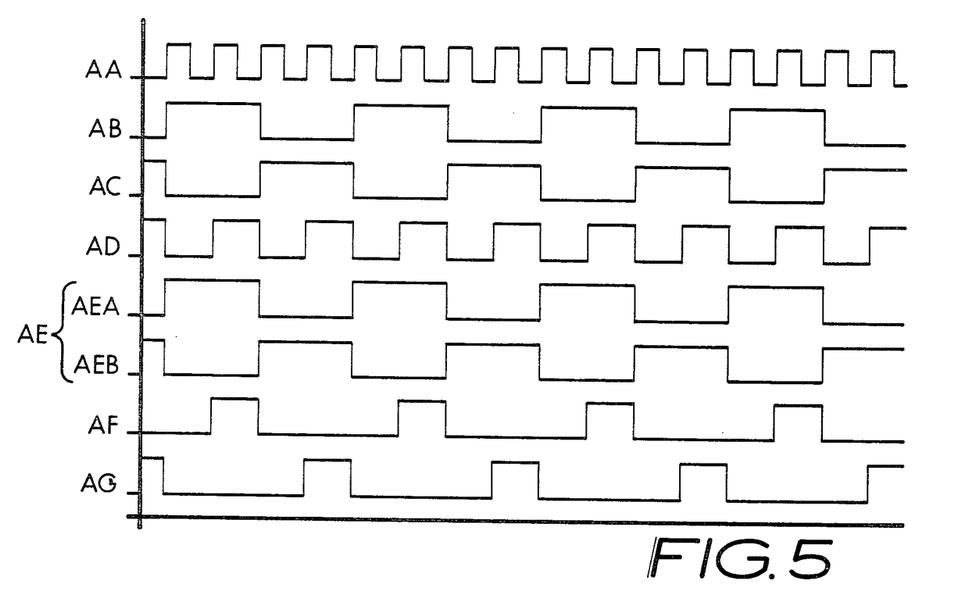
FIG. 5 electrical waveform depictions associated with the circuit of FIG. 4.

A clock oscillator, operating around 5,000 hertz or so, is made up of inverters 201, 202 and feedback elements 203, 204 in the form of a multivibrator. Inverters 201, 202 are typified as C-MOS type CD-4069 or the like. An inverter 205 further conditions the clock waveform and couples to the CK input of J-K flip-flop 301. Flip-flops 301, 302 each operate as divide-by-two functions. FIG. 5 provides waveforms which best show the various signal events intrinsic in the circuit of FIG. 4. Therefore waveform AA is the clock waveform on the flip-flop 301 input, whilst waveform AD shows the $F_{AA}/2$ waveform on the $\overline{Q}$ output. The Q output couples to the CK input for a second J-K flip-flop 302, with the Q and $\overline{Q}$ outputs coupled to driver transistors 310 and 315 respectively, by way of resistors 311 and 316. The result is an alternate saturation of the transistors by LOW outputs on the Q and $\overline{Q}$ lines, producing alternately acting pull-up of the collector on either transistor and producing the waveforms depicted as AB and AC. The further result is that for whichever of the two alternately saturated transistors 310, 315 is ON, the collector current will flow through respective light emanating diode 320, or else 325, and common ballast resistor 317. The "TRUE" lamp 320 and the "FALSE" lamp 325 act as signal sources, earlier explained for element 3 in FIG. 1, and are positioned subjacently to, e.g. behind, the interrogative document which for purpose of illustrating the utility of this particular embodiment, is in the form of a printed paper flash-card containing a question and two alternate answers TRUE or FALSE, one of which is effectively selected by the operator through the placement of the photodetector 111A in proximal relationship with the light rays included within the bounds of the selected response so as to provide interception of some of the rays emitted therefrom. This selected answer produces a unique pulse train pattern AE, represented as waveform AEA when intercepting the TRUE rays and by waveform AEB when intercepting the FALSE rays.

Figure 6:
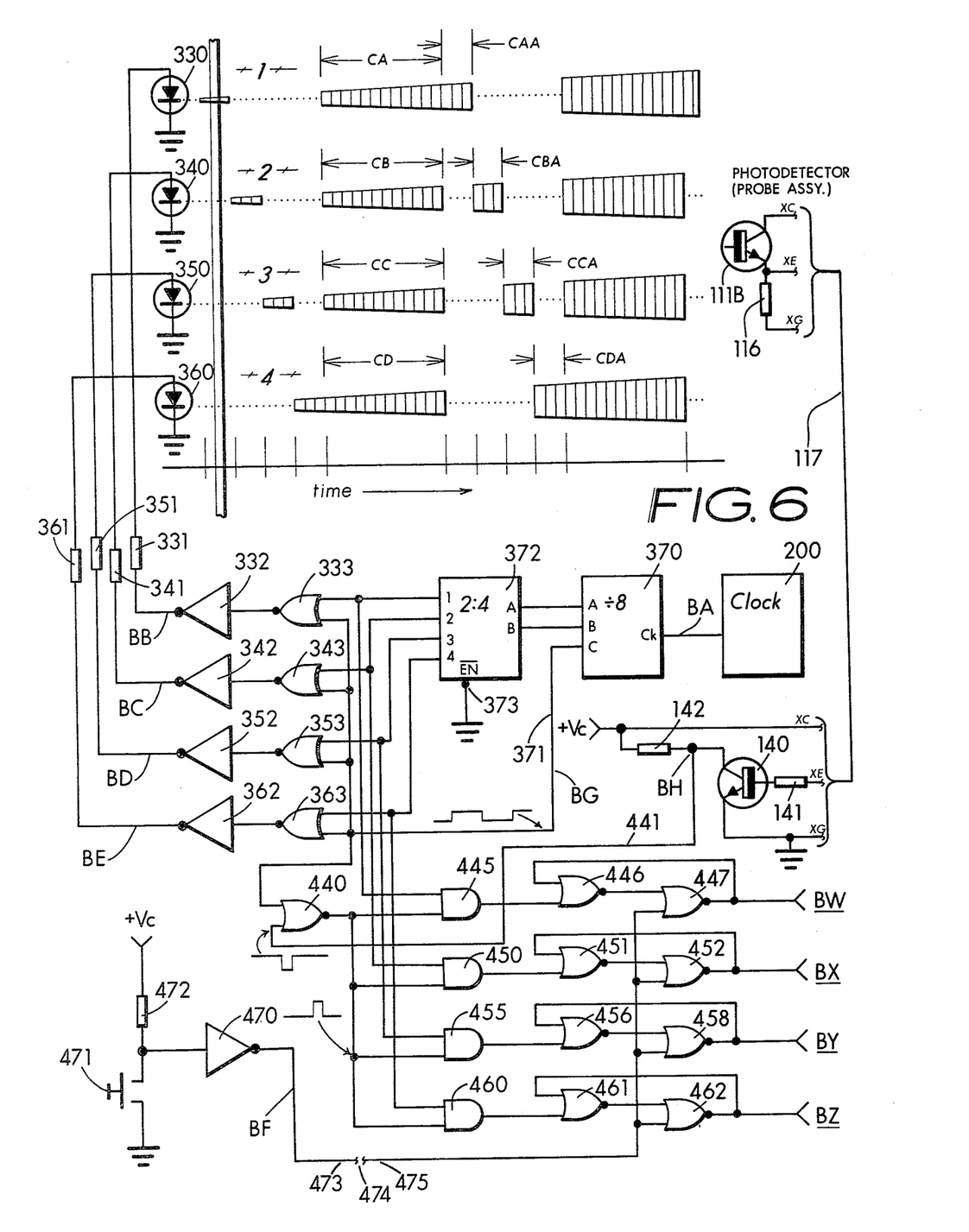
FIG. 6 electrical diagram for yet another embodiment of the instant teachings showing drive of a larger plurality of signal sources and an interrogative detector means signalling which choice is made.
Figure 7:
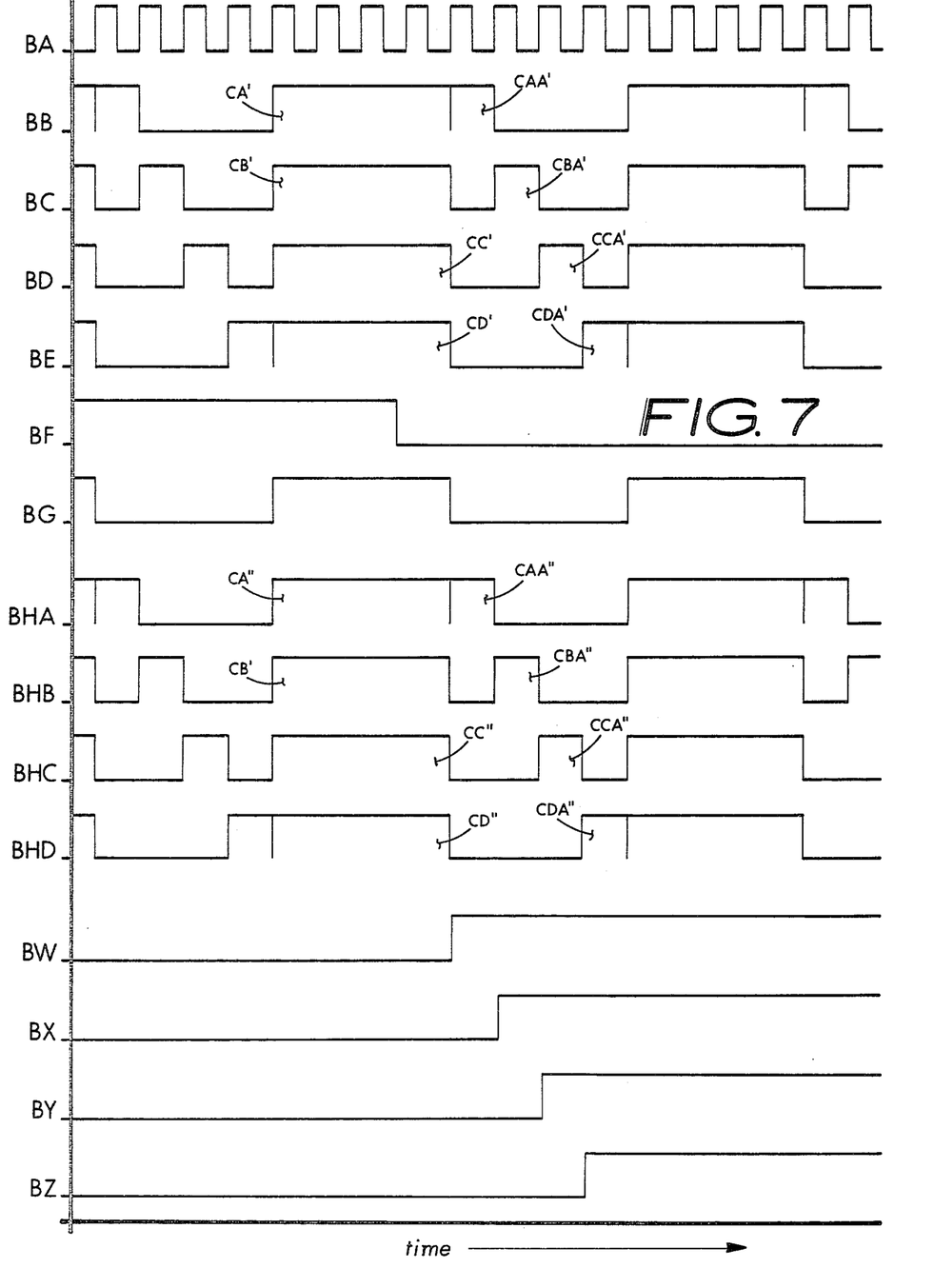
FIG. 7 electrical waveforms attendant to the circuit of FIG. 6.

The TRUE and FALSE synchronization signals produced by the flip-flop, 302 Q and $\overline{Q}$ outputs serve to control EXCLUSIVE-OR gates 405, 410 in accord with the state of the common input provided by gate 430. The EXCLUSIVE-OR gate 430 serves to combine the state signals produced by switches 435, 436 and pull-up resistor 437 so as to provide a key signal which flags the correct response relative to the operator selected answer. This is to say that the pulse signal value occurring on the AND gate 415, 420 inputs as provided on line 402 is compared with the synchronization signal available from the flip-flop 302 as selectively inverted or non-inverted by the input state conditions of gates 405, 410 and coupled respectively to gates 415, 420. For purpose of illustration, if both key switches 435, 436 are closed to ground, or else both connected to a logic HIGH state as shown in FIG. 4, the output of gate 430 will be LOW as coupled to the inputs of gates 405, 410. What next occurs is the operator will, for this illustration, select the TRUE lamp 320 rays which transilluminate the interrogative document with the input port 6 of the receptor probe thereby causing the detector 111A to respond in accord with the light pulse sequence code pattern emitted by the selected source. This will produce the waveform AEA to occur on inverter 125 output. The phasing, or time synchronization of this detected signal will compare with the synchronization signals on the gate 405 outputs and, the artisian will appreciate, coincidence will occur on the gate 415 inputs resulting in a HIGH state on the output, represented by waveform AF, which serves to turn-on transistor 501 and thus lighting the "RIGHT" light emanating diode through ballast resistor 317. Conversely a wrong selection, e.g. choosing the false response in the particular example set-up, will produce coincidence on gate 420 resulting in waveform AG and subsequent lighting of the "WRONG" lamp 515 by way of transistor 510 and gate resistance 511. In the preferred embodiment, the RIGHT lamp is green, whilst the WRONG lamp is red or orange. Other settings of the switches 435, 436 produce different RIGHT and WRONG response combinations in relation to the selected TRUE or FALSE source rays. In the practice of the invention, one switch is preprogrammed, as by an instructor while the other switch function is effectively set-up by some code form, as for example enciphered apertures, contained within the bounds of the interrogatory document. A power supply 601 and switch 602 serves to activate the necessary circuit elements to allow practice of the invention. A further improved embodiment of the invention is shown in FIG. 6. The gist of the improvement provided in this variation is the plurality of more than two source options which are selectable by the operator in response to any one of usually several interrogative statements imprinted on the overlay substrate 2'. Four sources 330, 340, 350 and 360 are depicted as located behind the substrate 2'. The first source 330 emanates a sequential continuum of light energy bursts, clearly shown by the electromagnetic coupling component CA including CAA. In a like way the second source emanates a uniquely coded sequence CB including CBA. The third source 350 and fourth source 360 also each emanate the coded light burst sequences CC including CCA and CD including CDA respectively. The artisian will quickly recognize that each emanator burst of primary rays is unique and the distinctive character is provided by variation in the timing of the bursts CAA, CBA, CCA, and CDA. A clock 200 produces a pulse train BA as best shown in FIG. 7 which couples to a divide-by-eight binary counter 370. The two least significant bits produced by the counter, bits A and B, couple to the 2-bit to 4-line decoder 372, exampledly a C-MOS type CD-4555. What results is a serial selection of the four decoder outputs 1, 2, 3, 4; the outputs each couple to one inpput of each of the NOR gates 333, 343, 353, 363. As long as the second input, which is common and coupled to the C output from the counter, is LOW the resulting effect is to rapidly step the individual sources ON in rapid-fire serial sequence, e.g. one at the time one after the other as depicted by waveforms BB, BC, BD, and BE. This sequential pulsing produces the CAA, CBA, CCA, and CDA component in the electromagnetic coupling mechanisim. However, as aforesaid, the counter C line couples to one input of each of the NOR gates. The C output is represented as waveform BG which, when in a HIGH state, will cause all of the NOR gate outputs to go to a logic LOW state: the effect is to turn-on all the sources 330, 340, 350 and 360 at the same time for so long as the C counter output line is HIGH. This occurs for four count cycles for the counter and results in the CA, CB, CC, and CD component part of the source to detector intercoupling radiant light signal.

The decoder 372 outputs each couple to one of the four AND gates 445, 450, 455 and 460 which serve as coincidence detectors. The operator selectively positions the probe input port over one of the plural sources. As is depicted in the figure the probe includes a phototransistor 111B and a load resistor 116. The probe circuit connects, by interconnections XC, XE, XG to the input of an amplifier stage including transistor 140 and base resistor 141. The result is that light energy impinging on the phototransistor 111B will cause the signal BH on the collector of transistor 140 to assume a LOW value. This value connects to one input of NOR gate 440 which serves to invert the signal and to inhibit the signal path when the counter C output is HIGH, e.g. when the signal data is invalid because all of the sources are ON. When the counter C line BG is LOW, coincidence occurs between the selected photodetector signal and the sequential synchronization signal coupled to the individual AND gates 445, 450, 455 and 460. The resultant coincidence will produce a HIGH state on the output of but one of the AND gates, which serves to set one of the storage flip-flops formed by the NOR gates 446, 447; 451, 452; 456, 458; or 461, 462. The end result is one of the output lines BW, BX, BY or BZ will assume a HIGH state which serves to indicate which source illuminated answer option was selected by the operator. For example, if the photodetector 111B is guided to intercept secondary rays from source 340, the output line BX will assume a HIGH state. In the waveforms of FIG. 7, the action of the exampled four choices are shown as pattern BHA, BHB, BHC, or else BHD depending on the operator's choice. Accordingly the waveforms show the resultant level change on one of the outputs BW, BX, BY, or BZ, respectively.

The waveform BF is a reset signal which occurs when switch 471 is closed causing the output of inverter 470 to go to a HIGH state.

Figure 8:
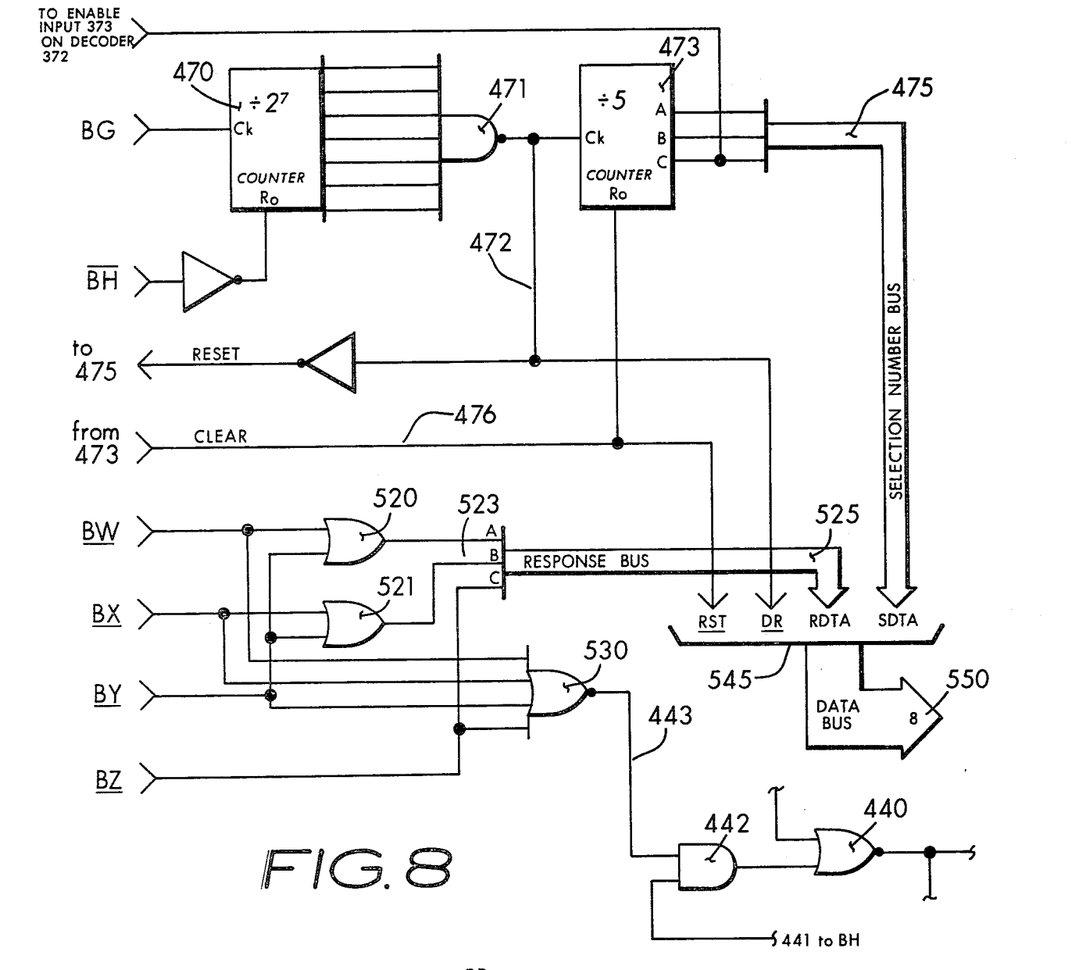
FIG. 8 alternate circuit detail which, when coupled with that of FIG. 6, produces data bus signals suited for external computer interface; and, FIG. 9 bandpass characteristics of typical optical elements employed with the invention.

The complement of the interrogative part of the response apparatus with an external control means, such as a computer, microprocessor, or the like is clearly depicted in FIG. 8. The counter 470 operates to provide a sporadic signal reject function. This is accomplished through the time-delay effect produced by the shown typical hookup. The CLOCK input receives BG signal from line 371, the C output of counter 370 in FIG. 6. This is a time reference signal, for the purpose of the elements depicted in FIG. 8, with rate being:

$$F_{BG} = F_{BA}/8 = \text{frequency (hertz)}$$

produced by clock 200, resulting in a time period:

$$T_{BG} = 1/F_{BG} = \text{time (seconds)}.$$

The result is that the counter 470 output will count $2^7$ times before the output lines assume a 1111111 state which enables NAND gate 471. This occurs in an elapsed time period $T_p$ equal to:

$$T_p = 2^7 \times T_{BG} = 128 \times T_{BG} = \text{time (seconds)}.$$

When this occurs line 472 goes state LOW resulting in a HIGH state on the RESET line connected to line 475 in FIG. 6. The purpose is the line 475 is controlled by the new circuits in FIG. 8, so the FIG. 6 reset circuits connected to line 473 are disconnected at showing 474. When the receptor probe is allowed to copulate with the signal source produced secondary rays, a pulse train signal appears on line $\overline{BH}$ which is inverted and coupled to the $R_0$ input of counter 470. When this signal is of bona fide form, the interpulse time period $T_{IP}$ will be less than that shown by $T_p$, with the HIGH state on line BH serving to RESET counter 470 so the outputs can never reach a 1111111 state as long as the bona fide $\overline{BH}$ signal occurs. This will occur as long as the responsor probe is held over any signal source produced secondary ray pattern. This produces an enabling HIGH level on the DR (data ready) line coupled to the DATA BUS 550.

The FIG. 8 circuit is initialized by the RESET circuits of FIG. 6 by way of line 473. A HIGH state on the CLEAR line resets ÷5 counter 473 $R_0$ input and flags the RST reset line on the DATA BUS 550. When the CLEAR line 473 resumes a LOW state, the counter 473 outputs will be state 000, as coupled to the selection number bus 475 and thereon to the SDTA lines feeding the DATA BUS 550. In the control mode shown: combining FIG. 6 and FIG. 8, the SDTA data represents:

| | | SDTA Lines | | | |
|---|---|---|---|---|---|
| RST | DR | C | B | A | Instruction |
| 0 | 1 | 0 | 0 | 0 | No response available |
| 0 | 1 | 0 | 0 | 1 | Response No. 1 |
| 0 | 1 | 0 | 1 | 0 | Response No. 2 |
| 0 | 1 | 0 | 1 | 1 | Response No. 3 |
| 0 | 1 | 1 | 0 | 0 | Response No. 4 |
| 1 | 1 | X | X | X | Reset |
| 0 | 0 | X | X | X | Data NOT ready |

The advance of counter 473 occurs when the leading edge of the HIGH state on the output of NAND gate 471 occurs when a $\overline{BH}$ signal is produced. Therefore as soon as the probe enters any bona fide signal field, SDTA will advance one state condition. Also when SDTA line C goes state HIGH, the connection to the ENABLE input on decoder 372 will halt any further response and the responsive apparatus will latch-up until reset by the operators actions or other means. With the effectuality of a RESET pulse on line 475, all inputs BW, BX, BY, and BZ will be state LOW. This state will go HIGH on one line in accord with the actions taught for FIG. 6, and that particular response bus 523 signal A B C, produced by binary encoders 520, 521 will effect a binary state on the RDTA lines for the DATA BUS 550 which flag the response selection. The NOR gate 530 produces a lock-out function on line 443 which couples to an AND gate 442 together with signal 441 coupled to BH, as outputted to NOR gate 440. The purpose is to latch-up the AND gates 445, 450, 455, 460 so as to prevent multiple entry of responsor signal selections on the BW, BX, BY, and BZ lines resulting in false RDTA data.

Figure 9:
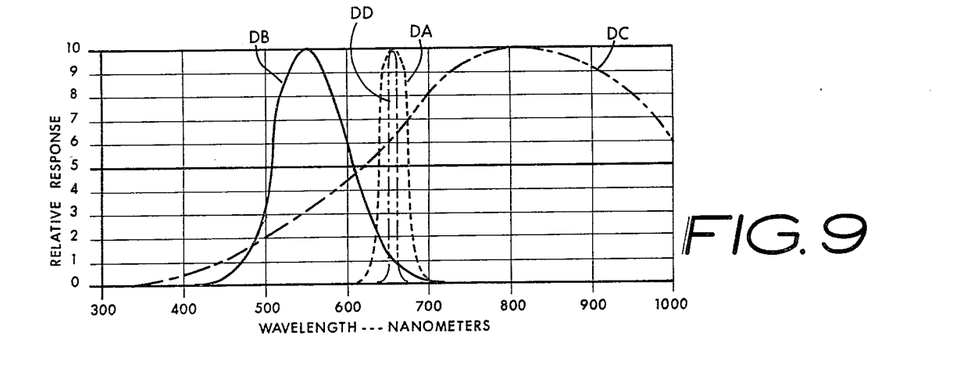

The spectral response for the elements comprising my invention are depicted in FIG. 9. Curve DA represents the wavelength energy from a typical red light emitting diode: for example the Monsanto MV-5050 series of gallium arsenide phosphide devices. Curve DB represents the standard observer curve established by the Commission Internationale de l'Eclair (e.g., CIE curve). Curve DC represents a good silicon phototransistor curve, the Monsanto MT-2 for example. The narrow curve DD shows the effect of a typical bandpass optical filter centered around 6,600 Å, resulting in the rejection of all but the peak longer wavelength deep red energy produced by the source. With such a filter affixed directly over the responsor input port, a significant immunity improvement to extraneous illumination is acheived. The result is an improvement in the apparent signal-to-noise response of the copulative receptor since the only part of the electromagnetic spectrum reaching the detector element of the receptor is that part which serves to allow effective electromagnetic energy intercourse between the light source and the photocell whilst extraneous light rays which might otherwise violate the receptor input port are substantially rejected.

I have hitherto described my invention in terms of a particular form because that form presents most clearly the method for utilization together with the manner of construction of a particular embodiment. It will however be understood that my invention is also applicable to other manner of construction.

The instant teachings depict particular types of integrated circuits, light sources, detectors, and manner of construction. A person skilled in the art can reasonably be expected to duplicate the effects of the same functions from built up circuits using individual components arranged in a multitude of combinations, with other combinations of integrated circuit gain devices, with other source means, and with cooperative detectors having different charcterization.

This teaching serves to depict a novel method for accomplishing the interchange of information between an intelligent being, a responsive apparatus such as a didactic machine by way of example, and an inexpensive to produce overlay substrate containing interrogative indicia or other meaning.

In particular my invention defines the method for providing a teaching machine, having a receptacle for a test document, in the form of a planar surfaced machine in the main supporting pulse burst coded light sources, a test document in the form of a relatively translucent printed paper sheet or the like which overlays the planate interactive surface, and a responsor probe in the form of a hand held probe which can be moved by a student so as to pick out particular response indicia on the test document and then cause the input port on the probe to pickup some light rays which pass through the translucent sheet, thereby effecting a scoring action or other such meaningful feedback effect to the student.

What I claim is:

1. Information interchange apparatus functionally coefficient between an indicia bearing substrate and a responsive apparatus, including in combination:
   (a) a substrate comprised in the main of a sheet of material which is at least effectively translucent to rays of light energy;
   (b) intelligence bearing symbolic stimuli provided as indicia means effectively supported by the said substrate;
   (c) signal source means with subjacent proximateness relative to the indicia bearing obverse surface of the said substrate effective so as to provide primary light rays, which serve in part to transilluminate at least some part of the said indicia, thereby producing visible denotation of the indicia situation to an operator, and which produce secondary rays to effectively emit from some part of the substrate obverse surface;
   (d) interrogation signal generator means coupled to said signal source means and effective to provide a unique sequential pulse train code pattern signal which serves as a source of excitation for the said signal source means;
   (e) effective coaction between the said signal source means and the said interrogation signal generator such that the said primary rays occur as bursts of light energy faithfully representative of the value of the said excitation signal;
   (f) receptor means including a translative input port effectively supported in variable superimposition relative to the said indicia bearing transilluminated substrate by the manipulative actions of an operator and effective as a translator of some part of the said secondary rays into a receptor pulse train signal the value of which substantially corresponds with the operator selected indicia weight;
   (g) response evaluator function coupled effectively with at least the said interrogation signal generator means and the said receptor means and functional therewith so as to provide an indicative signal at an output terminal; and,
   (h) d.c. power source coupled to the several essential elements comprising the said responsive apparatus so as to therefor provide operative energy.

2. Apparatus of claim 1 wherein more particularly the said operator resolves a choice between at least two indicia which are visibly transilluminated by separate signal source functions; the receptor is selectively positioned so as to allow the particular secondary light ray pattern produced proximate with a particular indicia to at least in part impinge upon the said receptor input port means; and wherein further such action produces an indicative signal output at a terminal which serves to at least flag the value of the operator determined selection.

3. Apparatus of claim 1 wherein more particularly the said operator acts with the visible transillumination so as to effect the positioning of the input port of the said receptor in substantially immediate coupling proximateness relative to secondary light rays extended by way of the translucent substrate whereupon the action serves to produce a pulse train signal which is effectively related with the synchronization signal produced by the said signal generator means so as to produce an indicative signal having value representative of the operator determined selection.

4. Apparatus of claim 1 wherein the said signal source means is an electroluminescent device, e.g. a light emitting diode or the like, having the capability for producing a rapid sequence of primary light ray bursts with electromagnetic emission wavelength lines which are visible to a human being and also receptive by a photodetector means.

5. Apparatus of claim 1 wherein more particularly the said light source means includes at least two light source elements, each serving to be representative of a differing indicia weight, wherein further each said source is caused to effect primary rays which serve to visibly transilluminate a distinctly different part of the substrate without significant overlap thereby effecting a pattern of secondary rays which serve to delineate a distinctly different choice of symbolic stimuli indicia value, for selection by the action of the said operator with the input port means.

6. Apparatus of claim 1 wherein more particularly the said interrogation signal generator means couples to at least two light source means and wherein further, said generator provides a sequential pulse train code pattern signal which is deliberately different for each said light source so as to provide identity therebetween when the primary light rays emanated by the particular source are coupled through the said substrate so as to produce secondary rays which are translated by the variably positioned said receptor into a receptor pulse train signal.

7. Apparatus of claim 1 wherein more particularly the said interrogation signal generator means couples to at least three light source means and wherein further, said generator provides a sequential pulse train code pattern signal which is deliberately different for each said light signal source through some part of each overall pulse train sequence cycle so as to provide identity therebetween when the primary light rays emanated by the particular source are coupled through the said substrate so as to produce secondary rays which are translated by the variably positioned said receptor into a receptor pulse train signal, and where importantly a part of the said code pattern signal is also effected so as to cause all the said light signal source means to be active for a significant portion of each duty cycle period $D_t$, such value being at least greater than that expressed by the determination:

$$\%D_t > 1/N_s \times 100$$

and preferably at least 50% so as to serve to increase the apparent visible illumination and thereby increasing the apparent brightness of the indicia illumination as perceived by the operator's eye.

8. Apparatus of claim 1 wherein more particularly is defined the receptacle for an interrogative document in the form of a planar surfaced machine in the main supporting some plurality of pulse burst coded light sources; a test document in the form of a relatively translucent indicia bearing substrate which effectively overlays the planate interactive surface; and a portable receptor in the form of a handheld responsor probe which can be translocated by a student, so as to pick out particular visibly transilluminated indicia detail on the said test document, to effectively position the input port on the probe to pickup some light rays which pass through the translucent sheet; thereby producing a meaningful feedback to the student regarding the student's elective action.

9. Apparatus of claim 1 wherein more particularly the essence of the invention is found in the illumination of the reverse side of a sheet-like effectively translucent substrate with primary rays of electromagnetic light energy from signal source means having dominant emitted ray power concentration lying in the electromagnetic spectrum between 4,000 Angstroms and 8,000 Angstroms with a goodly part of the light emissions being in the usual visible spectrum as perceived by a human eye; wherein further said substrate serves to in part pass the said primary rays by the effects of transillumination so as to produce visible light and secondary rays to emit effectively from some part of the obverse side of the said substrate; wherein the input port of a receptor is caused to find at least some part of the said secondary rays which serve as a coupling mechanism through the effectual actions taken by the said operator; wherein the said receptor translates the said secondary rays which may influx by way of the input port into a pulse train signal.

10. Apparatus of claim 1 wherein more particularly the said response evaluator function further includes converter means for adaptation of the said indicative signal into a DATA BUS signal which may be acted upon in a decisive way by a computer machine.

11. Apparatus of claim 1 wherein more particularly the said indicative signal is converted into binary signal values the weight of which serve to indicate the correctitude of the operator's actions relative to the receptor interaction with secondary rays attendant to any particular substrate borne indicia.

12. Apparatus of claim 1 wherein more particularly the said response evaluator includes a signal delay means which retards the said indicative signal change so as to preclude errors brought about by marginal secondary ray reception by the said receptor input port.

13. Apparatus of claim 1 wherein more particularly each distinctly separate entry of secondary ray signal sequences into the said receptor said input port is counted as a separate entry and advances a selection counting means which inhibits further entry after all allowed entries have been attempted by an operator.

14. Apparatus of claim 1 wherein more particularly further improvement in the signal-to-noise response of the said receptor is brought about through the effective emplacement of an optical filter means which serves to efficiently pass that part of the electromagnetic spectrum which will allow effective coupling mechanisim intercourse between the rays produced by the said signal source and translated by the said receptor whilst substantially rejecting extraneous light energy rays which may violate the said input port.

* * * * *